United States Patent [19]

Takahashi

[11] Patent Number: 5,142,176
[45] Date of Patent: Aug. 25, 1992

[54] MOTOR WITH ROTOR MAGNET THRUST BEARING

[75] Inventor: Masahiro Takahashi, Kanagawa, Japan

[73] Assignee: Fuji Xerox Co., Ltd., Tokyo, Japan

[21] Appl. No.: 723,221

[22] Filed: Jun. 28, 1991

[51] Int. Cl.⁵ .............. H02K 21/14; F16C 39/06; F16C 17/10

[52] U.S. Cl. .............. 310/90.5; 310/67 R; 310/156

[58] Field of Search .............. 310/90.5, 67 R, 154, 310/156, 157, 254, 90

[56] References Cited

U.S. PATENT DOCUMENTS

| | | | |
|---|---|---|---|
| 4,445,056 | 4/1984 | Gaylord | 310/54 |
| 4,820,950 | 4/1989 | Hijiya et al. | 310/90.5 |
| 4,864,174 | 9/1989 | Kawamura et al. | 310/261 |
| 5,019,738 | 5/1991 | Weilbach et al. | 310/90.5 |

Primary Examiner—Steven L. Stephan
Assistant Examiner—D. Rebsch
Attorney, Agent, or Firm—Finnegan, Henderson, Farabow, Garrett & Dunner

[57] ABSTRACT

A motor having a housing, an axle fastened to the housing, a rotation sleeve inserted with a space around the axle to form a dynamic pressure air bearing together with the axle, a magnet fastened to the rotation sleeve, and a stator core fastened to the housing and positioned so that a thrust bearing functions by magnetic attraction force generated between the stator core and the magnet. The stator core includes a protruding portion formed on a surface of the stator core facing magnet; the protruding portion is positioned so that a center line of the protruding portion is shifted from a center line of the stator core, the center line of the protruding portion being shifted from the center line of the stator core in the opposite direction to the gravitational force on the rotation sleeve.

9 Claims, 4 Drawing Sheets

MOTOR WITH ROTOR MAGNET THRUST BEARING

BACKGROUND OF THE INVENTION

1. Field of the Invention

The invention relates to a motor using a dynamic pressure air bearing as a radial bearing and as a thrust bearing by utilizing the magnetic attraction force between a magnet and a stator core.

2. Discussion of the Related Art

Radial bearings are used for preventing the center of rotation of a rotating device from being shifted from a predetermined position, even if a force is applied at a right angle to the axis of rotation.

Conventionally, motors have utilized a dynamic pressure air bearing as a radial bearing. FIG. 2 shows a conventional motor, which is used to rotate a polygonal mirror of a light deflecting apparatus. As shown in FIG. 2, a rotor portion of the motor is inserted to provide a space 15 between a rotation sleeve 3 and an axle 1. The axle 1 includes dynamic pressure generating grooves 1-1, and a balancer fitting groove 4 is provided in the rotation sleeve 3. The rotor further includes a yoke 5 and a magnet 6 fastened to the rotation sleeve 3 by press fitting or adhesive, and polygonal mirror 11 having a flange 12 and being fastened to the rotation sleeve 3 by screws 13.

The stator portion of the motor includes a housing 2, and the axle 1 is fastened to the housing 2 by press fitting or the like. A stator core 7 is fastened to the housing 2, a toroidal coil (not shown in the drawing figures) is coiled around the stator core 7, and a substrate 9 is hung by a stud 8 fastened to the stator core 7, with a magnetism detecting element 10 being fixed to the substrate 9.

The magnet 6 is a permanent magnet and a magnetic attraction force is generated between the magnet 6 and the facing stator core 7. The facing position of the magnet 6 and the stator core 7 is maintained in a certain position along the direction of the axis of the motor (thrust direction) by the magnetic attraction force.

That is, in FIG. 2, when the magnet 6 moves upward, a downward component appears in the magnetic attraction force to pull the magnet 6 down. On the other hand, when the magnet 6 moves downward, an upward component appears in the magnetic attraction force appears to pull the magnet 6 up. Thus, the magnet 6 and the stator core 7 face each other in the desired position along the direction of the axis, i.e., a magnetic thrust bearing is formed by the magnet 6 and the stator core 7.

The magnetism detecting element 10 may be a Hall element, for example, which detects the leakage flux of the magnet 6 and outputs detection signals to indicate whether an N-pole or S-pole has passed. The detection signals pass through a wiring printed on the substrate 9 and are transmitted to a controlling portion not shown in the figures. Based on the detection signal, the controlling portion determines the direction of the electric current flowing in the toroidal coil, which is coiled around each part of the stator core 7. Consequently, a magnetic field occurs between the magnet 6 and the stator core 7 to keep the rotation sleeve 3 rotating.

By setting the dynamic pressure generating grooves 1-1, an air layer of high pressure is generated around the axle 1 (i.e. in the space 15) when the rotation sleeve 3 rotates. Thus, the rotation sleeve 3 is floatingly supported about the axle 1, that is, a dynamic pressure air bearing is formed.

Alternatively, the dynamic pressure generating grooves can be set on the inner wall of the rotation sleeve 3, though they are set on the circumference of the axle in the above example.

The air layer keeps the center of the rotation of the rotor portion in a certain position. For instance, in FIG. 2, if the rotation sleeve 3 is shifted rightward, the right side of the space 15 expands and then the pressure of that part of the space 15 becomes lower than before the rotation sleeve 3 shifted. On the other hand, because the left side of the space 15 becomes more narrow, the pressure in the left part of the space 15 becomes higher than before the rotation sleeve 3 shifted. If the relation of the pressure is as explained above, the rotation sleeve 3 will be moved leftward as a consequence of the pressure differential, and finally returned to the original position.

The polygonal mirror 11 has plural mirrors on the side faces of its circumference. The mirrors, for example, are irradiated by a light beam from a laser. As the polygonal mirror 11 rotates while the light beam irradiates a first mirror, a reflected light beam of the incident light beam gradually turns its direction, i.e., it is deflected.

The polygonal mirror 11 rotates further such that the light beam cannot irradiate the first mirror, then the second mirror comes around and is irradiated by the light beam. Light is then deflected by the second mirror. In this manner, the reflected light beams scan within a certain angular range, and the scanning speed depends on the rotating speed of the polygonal mirror 11.

However, the conventional motor described above has a problem in that the axis of the motor gets longer because the length of the axis direction of the magnet must be longer than that of the stator core.

FIG. 3 is an enlarged view showing the portions of the magnet 6 and the stator core 7 in a conventional motor. F is the gravitational force on the rotor portion, $O_6$ is a center line of the magnet 6, $O_7$ is a center line of the stator core 7, L is a gap between these center lines, H is a difference between the length of the magnet 6 and the stator core 7 in the axial direction, and $\phi$ is the magnetic flux.

Conventionally, sections of the facing surfaces of the magnet 6 and the stator core 7 make parallel lines. Magnetic flux $\phi$ entering the stator core 7 from the magnet 6 is the source of magnetic attraction force and creates the function of a thrust bearing.

If the magnet 6 and the stator core 7 are positioned such that their center lines $O_6$ and $O_7$ are colinear, magnetic flux $\phi$ is distributed in up-and-down symmetry with respect to the center lines. However, the center lines cannot be maintained in such a position. The reason is that the rotor portion including the magnet 6 is floating and the gravitational force F pulls downward, however, under the condition that the magnet 6 and the stator core 7 are located as described above, an upward balancing force countering the gravitational force F cannot be generated.

For the generation of a balancing force, the magnet 6 needs to descend so that magnetic flux density entering into the lower end of the stator core 7 from the lower end of the magnet 6 in the upper right direction becomes higher than that entering into the upper end of the stator core 7 from the magnet 6 in the lower right direction. The larger the difference between the magnetic flux density in the upper direction and that in the lower direction becomes, the larger the upward component of the magnetic attraction force. The magnet 6 stops descending when the upward component of magnetic attraction force is large enough to establish a balance with the gravitational force F. FIG. 3 is a view showing the state of the magnet 6 having descended as described above. As a consequence of the descent of the magnet 6, the gap L occurs between the center line $O_6$ of the magnet 6 and the center line $O_7$ of the stator core 7.

If the upper end of the magnet 6 falls lower than the upper end of the stator core 7, the magnetic flux $\phi$, which reaches a part of the toroidal coil around the stator core 7 that does not face the magnet 6, is reduced, and the generated torque becomes smaller. Thus, the length of the magnet 6 in the axial direction is made longer than that of the stator core 7 in order to prevent the upper end of the magnet 6 from dropping down below the upper end of the stator core 7 as a result of the gravitational force F. Therefore, in FIG. 3, H is a difference between the lengths of the magnet 6 and the stator core 7 in the axial direction Because the length of the magnet 6 must be longer than that of the stator core 7 in the axial direction, the axial length of the motor becomes longer. Empty internal space is also needed to accommodate the length of H in the axial direction.

SUMMARY OF THE INVENTION

The present invention has been made in view of the above circumstances and has as an object to overcome the disadvantages of the conventional motor described above.

Another object of the present invention is to reduce the axial length of a motor having a dynamic pressure air bearing.

The objects and advantages of the invention may be realized and attained by means of the instrumentalities and combinations particularly pointed out in the appended claims.

To achieve the objects. and in accordance with the purposes of the invention, as embodied and broadly described herein, the motor of this invention comprises a housing. an axle fastened to the housing. a rotation sleeve inserted with a space around the axle to form a dynamic pressure air bearing together with the axle, a magnet fastened to the rotation sleeve, and a stator core fastened to the housing and positioned so that a thrust bearing functions by magnetic attraction force generated between the stator core and the magnet. The stator core includes a protruding portion formed on a surface of the stator core facing towards the magnet, the protruding portion is positioned so that a center line of the protruding portion is shifted from a center line of the stator core in a direction opposite of a gravitational force on the rotation sleeve.

BRIEF DESCRIPTION OF THE DRAWINGS

The accompanying drawings, which are incorporated in and constitute a part of this specification illustrate embodiments of the invention and, together with the description, serve to explain the object, advantages and principles of the invention.

In the Drawings.

DETAILED DESCRIPTION OF THE PREFERRED EMBODIMENTS

The embodiments of present invention will be described in detail based on the drawings.

Figure 1:
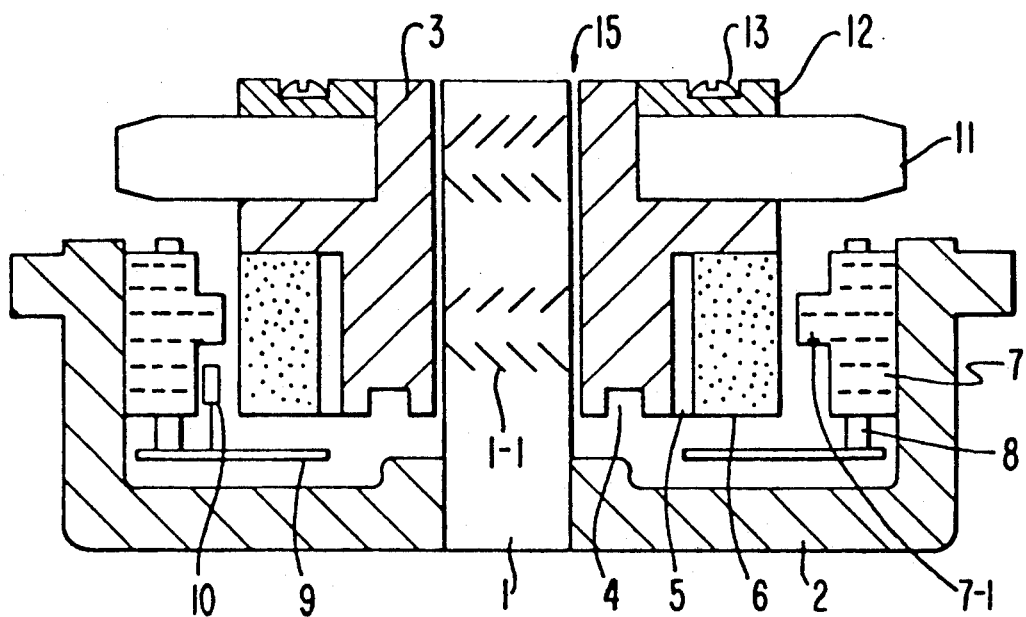
FIG. 1 is a view showing a motor constructed in accordance with some of the embodiments of the present invention.
Figure 2:
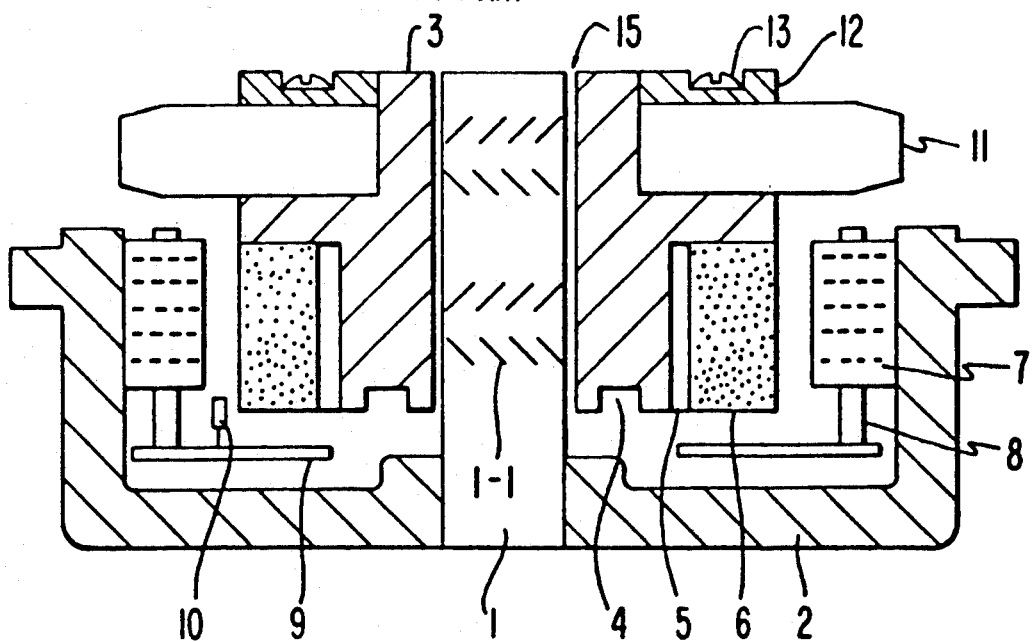
FIG. 2 is a view showing a conventional motor.

FIG. 1 is a view showing a motor according to the present invention. The motor may be used to rotate a polygonal mirror 11 in a light deflecting apparatus, just like in the apparatus shown in FIG. 2. The numbers used in conjunction with FIG. 1 represent parts corresponding to those shown in FIG. 2. A departure from the conventional motor is the forming of a protruding portion 7-1 on the stator core 7 in the upper half of the stator core surface facing the magnet 6.

Figure 3:
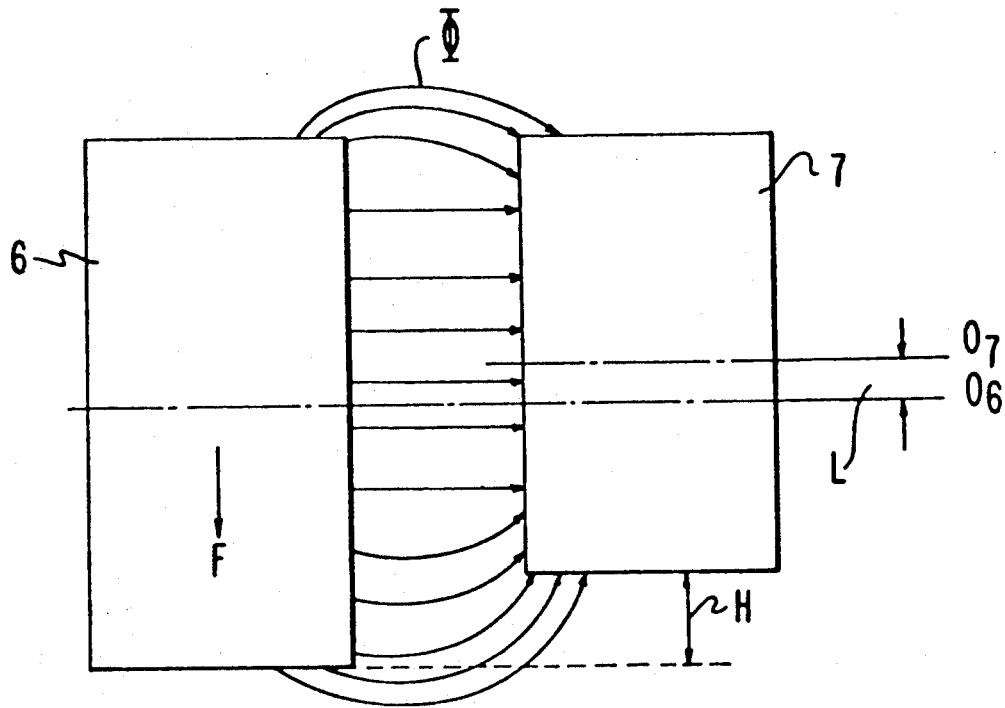
FIG. 3 is an enlarged view showing portions of the magnet and the stator core of the conventional motor.
Figure 4:
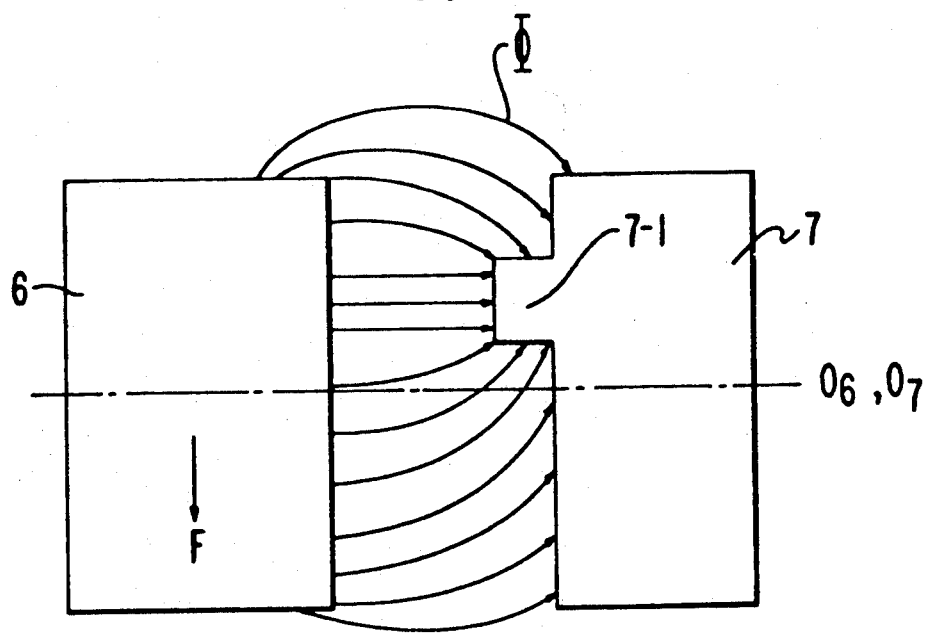
FIG. 4 is an enlarged view showing portions of the magnet and the stator core constructed in accordance with a first embodiment of the present invention.

FIG. 4 is an enlarged view showing the magnet portion and the stator core portion constructed in accordance with a first embodiment of the present invention. The reference numbers and values used in conjunction with FIG. 4 represent parts corresponding to those shown in FIG. 3.

Since the protruding portion of the stator core 7-1 is formed in the upper half of the stator core 7, when the magnet 6 and the stator core 7 are located opposite to each other so that the center line $O_6$ and the center line $O_7$ are colinear, the distribution of magnetic flux $\phi$ is asymmetric with respect to the protruding portion of the stator core 7-1. In the region in which the protruding portion is formed on the stator core 7, the space between the magnet 6 and the stator core 7 becomes narrow; therefore the magnetic flux $\phi$ in this region is higher than in the other regions. Forming of the protruding portion in the upper half of the stator core 7 generates an upward component of the magnetic attraction force.

As the position of the protruding portion of the stator core 7-1 is raised, the difference between the density of magnetic flux $\phi$ entering into the upper side of the stator core and that entering into the lower side of the stator core becomes larger, and accordingly, the upward component of the magnetic attraction force also becomes larger. Thus, the position of the protruding portion of the stator core 7-1 is selected so that the upward component of the magnetic attraction force is large enough to establish a balance with the gravitational force F on the rotor portion.

Because the magnet 6 and the stator core 7 can be positioned opposite to each other such that the center line $O_6$ of the magnet 6 and the center line $O_7$ of the stator core 7 are colinear by forming the protruding portion of the stator core 7-1 as mentioned above, it is not necessary that the axial length of the magnet 6 be longer than the axial length of the stator core 7. Consequently, the axial length of the motor can be shorter than that of the conventional motor, and no internal space is wasted.

Figure 5:
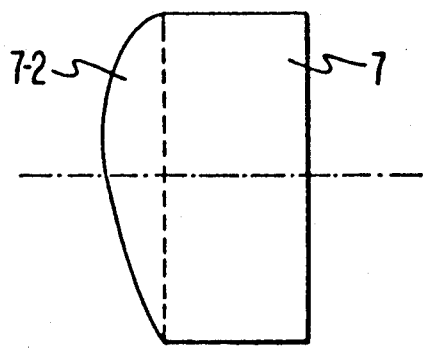
FIG. 5 is an enlarged view showing a portion of the stator core constructed in accordance with a second embodiment of the present invention.

In a second embodiment of the present invention, the stator core may be formed as shown in FIG. 5. In this embodiment, the protruding portion of the stator core 7-2 is formed as a continuous convex area on the surface of the stator core 7 facing the magnet 6.

The protruding portion of the stator core 7-2 can be either formed as a continuous convex area so as to go around the inner peripheral surface of the stator core 7, or formed as a noncontinuous protrusion.

Figure 6:
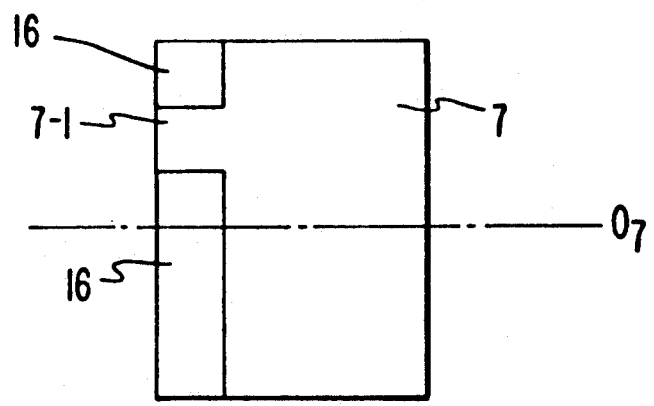
FIG. 6 is an enlarged view showing a portion of the stator core constructed in accordance with a third embodiment of the present invention.

If the stator core has a section such as in FIG. 4, in coiling the toroidal coil around the stator core, a spacing occurs between the toroidal coil and the stator core caused in part by the intermittent coil heights of the toroidal coil, and therefore it is not desirable in terms of firmness of machinery. Therefore, in accordance with a third embodiment of the present invention, to prevent the occurrence of such spacing, insulating material members 16 may be provided above and below the protruding portion of the stator core 7-1 to make the section of the stator core 7 rectangular, as shown in FIG. 6. Then the toroidal coil can be tightly coiled around the stator core 7 faired by insulating material members 16, and consequently the occurrence of such spacing can be avoided.

Figure 7:
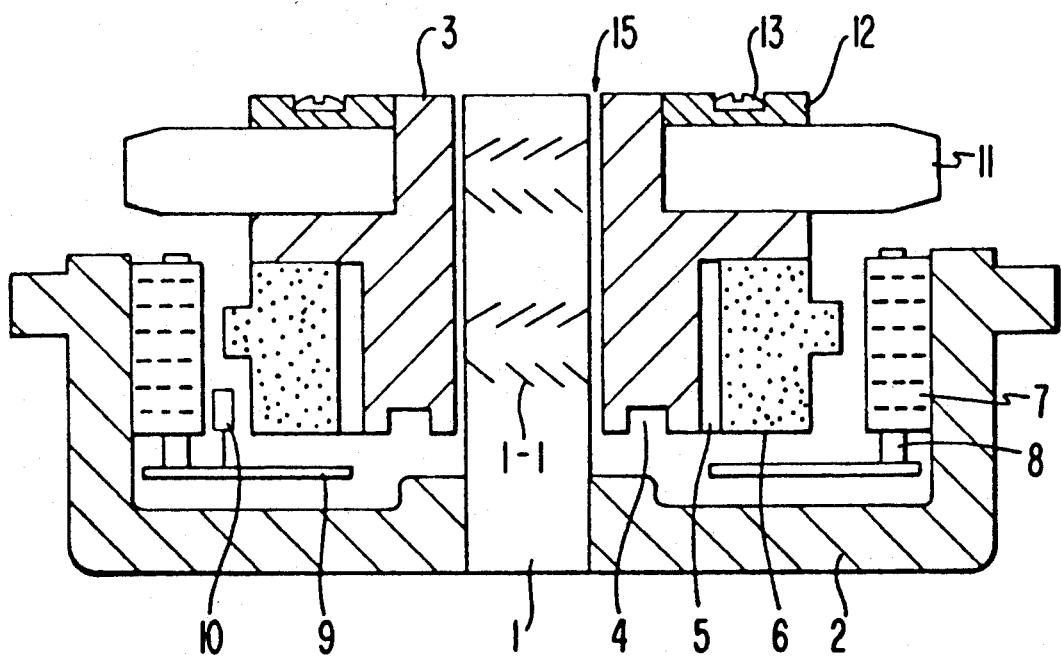
FIG. 7 is a view showing a motor constructed in accordance with other embodiments of the present invention.

Although the protruding portion is described in the foregoing embodiments as being formed on the surface of the stator core, the protruding portion can similarly be formed on the surface of the magnet 6 with the same effect. Such an embodiment is shown in FIG. 7.

The foregoing description of preferred embodiments of the present invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A motor, comprising:
   a housing;
   an axle fastened to said housing;
   a rotation sleeve inserted with a space around said axle to form a dynamic pressure air bearing together with said axle;
   a magnet fastened to said rotation sleeve; and
   a stator core fastened to said housing and positioned so that a thrust bearing functions by magnetic attraction force generated between said stator core and said magnet,
   wherein said stator core includes a protruding portion formed on a surface of said stator core facing towards said magnet, said protruding portion being positioned so that a center line of said protruding portion is shifted from a center line of said stator core, the center line of said protruding portion being shifted from the center line of said stator core in a direction opposite to a gravitational force on said rotation sleeve.

2. The motor according to claim 1, wherein the length of said magnet in an axial direction is substantially equal to the length of said stator core in said axial direction.

3. The motor according to claim 1, wherein said protruding portion is formed as a continuous convex area on said surface of said stator core.

4. The motor according to claim 1, wherein said protruding portion is formed as a non-continuous protrusion on said surface of said stator core.

5. The motor according to claim 1, wherein said stator core is a toroidal stator core.

6. The motor according to claim 5, wherein said toroidal stator core further includes insulating material members placed on said surface of said stator core such that said protruding portion does not protrude from said surface of said toroidal stator core.

7. The motor according to claim 1, wherein said protruding portion is positioned on said stator core such that in operation of the motor the center line of said stator core and a center line of said magnet are substantially colinear.

8. A light deflecting apparatus, comprising:
   a housing;
   an axle fastened to said housing;
   a rotation sleeve inserted with a space around said axle to form a dynamic pressure air bearing together with said axle;
   a polygonal mirror fitted on said rotation sleeve;
   a magnet fastened to said rotation sleeve; and
   a stator core fastened to said housing and positioned so that a thrust bearing functions by magnetic attraction force generated between said stator core and said magnet,
   wherein said stator core includes a protruding portion on a surface of said stator core facing towards said magnet, said protruding portion being positioned so that a center line of said protruding portion is shifted from a center line of said stator core, the center line of said protruding portion being shifted from the center line of said stator core in an opposite direction of a gravitational force on said rotation sleeve.

9. A motor, comprising:
   a housing;
   an axle fastened to said housing;
   a rotation sleeve inserted with a space around said axle to form a dynamic pressure air bearing together with said axle;
   a magnet fastened to said rotation sleeve; and
   a stator core fastened to said housing and positioned so that a thrust bearing functions by magnetic attraction force generated between said stator core and said magnet,
   wherein said magnet includes a protruding portion formed on a surface of said magnet facing towards said stator core, said protruding portion being positioned so that a center line of said protruding portion is shifted from a center line of said magnet, the center line of said protruding portion being shifted from the center line of said magnet in a direction opposite to a gravitational force on said rotation sleeve.

* * * * *